Patented Feb. 23, 1932

1,847,031

UNITED STATES PATENT OFFICE

OSCAR ANTON WIBERG AND GEORG ARNÖ, OF FINSPONG, SWEDEN

REGULATING DEVICE FOR ELASTIC FLUID TURBINES

Application filed October 17, 1928, Serial No. 313,060, and in Great Britain October 24, 1927.

This invention relates to apparatus for controlling or governing the admission of steam to turbines, of the type in which the steam admission valve is operated by an oil supply from a pump.

The object of the invention is to provide an apparatus of the said type in which the pressure of the exhaust steam of the turbine and the boiler pressure in conjunction are used to control the operation of the apparatus so as to maintain said pressure or pressures at a constant or substantially constant level, for instance, in order to enable the turbine constantly to operate under the best conditions. The invention is characterized by the provision of two relay valves which are controlled by each of said pressures to control the pressure of the oil supply used to effect the operation of the steam admission valve.

In the accompanying drawings several embodiments of the invention are illustrated in a substantially diagrammatic manner.

Figure 1:
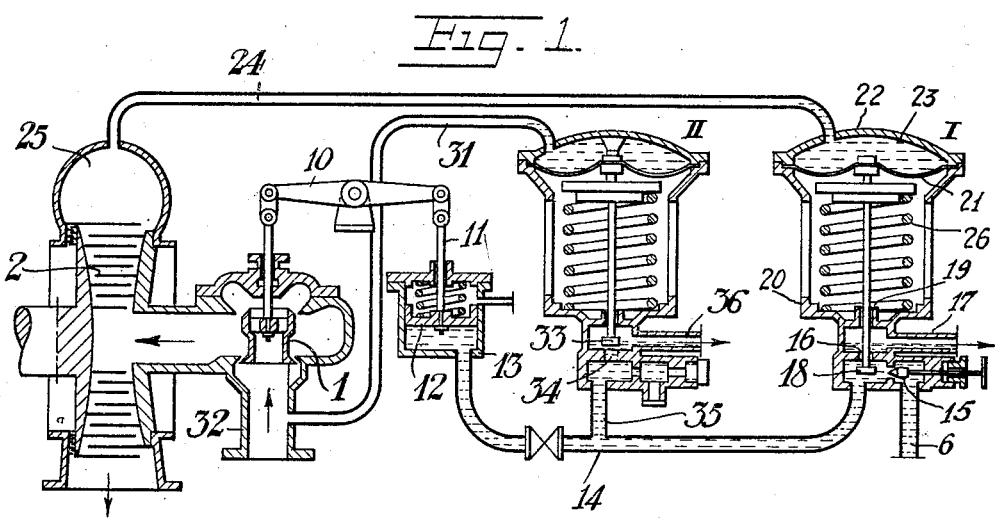
Fig. 1 is a section through a regulating system according to the invention.

In Fig. 1 the steam admission valve 1 of the turbine 2 is connected by a link to one end of a lever 10 connected at its opposite end by means of a link to the rod 11 of a spring operated piston 12 within a working cylinder 13 in which the space below the piston is connected by a branch pipe 14 to an oil supplying pipe 6 leading from an oil pump, not shown.

The connection between the pipes 6 and 14 is controlled by an adjustable valve 15. Through an opening 16 in the wall of pipe 14 the latter may communicate with a drain pipe 17. Said opening 16 is controlled by an oil release valve 18 comprising a rod which may slide up and down in a bushing 19, upstanding from the bottom of a casing 20. Said rod 18 is attached at its upper end to a diaphragm 21, clamped at its periphery between the side wall of the casing 20 and a cover 22 of said casing so as to form a closed chamber 23 between it and the cover 22. Said chamber 23 is connected by the pipe 24 to the exhaust chamber 25 of the turbine 2.

The valve 18 is acted upon by a spring 26 tending to move the diaphragm upwardly in order to cover the opening 16. The casing 20 and the elements contained therein will be termed a relay valve in this description and is indicated as a whole by the reference numeral I. In addition to said relay valve I which is controlled by the exhaust pressure of the turbine, a second relay valve indicated as a whole by the reference numeral II is provided which is controlled by the live steam pressure. The relay valve II is connected by the pipe 31 to the steam admission pipe 32 in front of the valve 1. The oil release valve 33 of relay II controls an opening 34 between a branch pipe 35 leading from pipe 14 and a drain pipe 36.

The operation is as follows:

It may be assumed that the oil pump maintains a substantially constant oil pressure within the pipe 6. When the pressure in the exhaust chamber 25 and thus also in the pipe 24 falls the force acting on the upper side of the diaphragm 21 of relay valve I will accordingly fall, allowing the spring 26 to lift the oil release valve 18 so as to prevent oil from being drained off through opening 16 and pipe 17. As a result, the pressure within pipe 14 will rise and move the piston 12 in the cylinder 13 upwards, thereby lowering the valve 1 so that the latter will admit more steam to the turbine.

Let it now be assumed that the pressure in the exhaust chamber 25 rises, then the pressure within chamber 23 will rise accordingly, depressing the diaphragm 21 and uncovering the opening 16. The opening 16 is larger than the opening at valve 15 and, as a result, the pressure within pipe 14 will fall, allowing the spring acting on the piston 12 to lower said piston. The piston 12, when thus lowered, will cause the lever 10 to turn on its pivot so as to lift the valve 1 causing it to reduce the admission of steam to the turbine.

The smaller the opening past the valve 15, the smaller are the movements that the valve 18 need make to control the oil pressure within the pipe 14. A reduced movement of said valve corresponds to a reduced expansion of the spring 26, that is, to a reduced variation of the pressure above the diaphragm 21. It is thus seen that variation of the responsibility of the regulating device may be obtained by adjustment of the valve 15.

The release valve 33 of relay valve II will open due to a reduced boiler pressure thereby causing a reduction of the oil pressure in pipe 14 and accordingly below piston 12 in the working cylinder 13 so that said piston will move downwards to close the steam admission valve 1.

Figure 2:
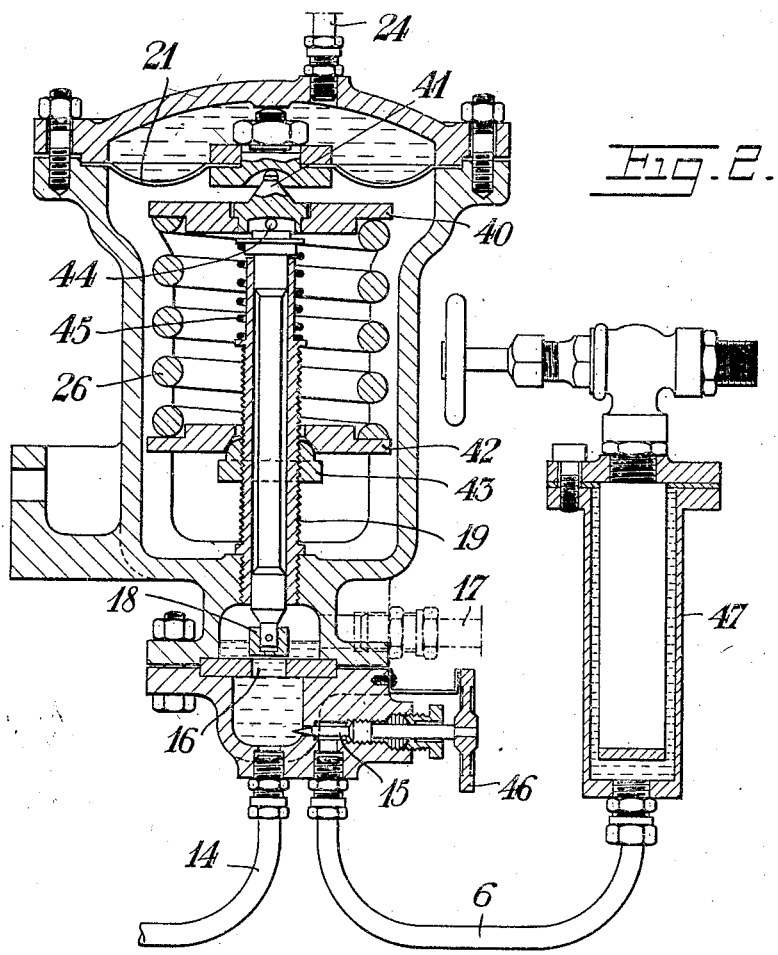
Fig. 2 is a detailed vertical section of a relay valve according to this invention.

The design of the relay I is more clearly illustrated in Fig. 2. In this figure the numeral 24 indicates the pipe supplying the impulse pressure that acts on the upper side of the diaphragm 21. The diaphragm is shaped as a cup in order to render it more resistant to pressure than a plane diaphragm. The movement of the diaphragm is transmitted to the spring operated disk 40 which bears against the diaphragm by a universal joint as shown at 41. The spring 26 acting on the under side of the disk 40 is supported by a disk 42 carried by a nut 43 screwed on the bushing 19 by means of which the compression of the spring 26 may be adjusted. A ball 44 is inserted between the under side of the disk 40 and the top of the stem of valve 18 to prevent lateral stresses caused by a spring 26 from being transmitted to said valve stem whereby distortion of the operation of the relay might, otherwise, occur. A spring 45 is provided to maintain the steam in engagement with said ball 44. The oil release valve proper is shown at 18. The valve 15 controlling the supply of oil from the pump is shown as a needle valve which may be adjusted by means of the hand wheel 46. At 17 the drain pipe is indicated, and at 6 and 14 the supply pipe leading from the pump and the pipe leading to the working cylinder are indicated. In the pipe 6 an oil filter 47 may be inserted.

It is to be noted that no packing need be inserted between the stem of valve 18 and the bushing 19, as no oil may leak therebetween because of the provision of the drain pipe 17.

The relay valve indicated at II in Fig. 1 is of a design substantially similar to that above described with reference to Fig. 2 except that no adjustable valve, as 15 of relay valve II, is provided.

What we claim is:

1. A regulating device for elastic fluid turbines, comprising in combination a valve to control the admission of elastic fluid to the turbine, a working cylinder and its piston to operate said admission valve, a pressure oil supply leading to said working cylinder, a relay valve mechanism adapted to be operated by the exhaust pressure of the turbine to control the pressure of the oil supply to said working cylinder, another relay valve mechanism operated by the live fluid pressure to act in conjunction with said first mentioned relay valve mechanism to effect said control operation, and an adjustable valve in said oil supply in front of said relay valve mechanisms.

2. A regulating device for elastic fluid turbines, comprising in combination a fluid admission valve, a working cylinder and its piston to operate said valve, a pressure oil supply leading to said working cylinder, a relay valve comprising a chamber communicating through an opening in its bottom with said oil supply, a drain pipe leading from said chamber, a bushing upstanding from the top wall of said chamber, a valve guided by said bushing to control said opening, a spring operated diaphragm subjected to the exhaust pressure of the turbine to operate said valve; a second relay valve mechanism operated by the live fluid pressure and cooperating with said first relay valve for the control operation, and an adjustable valve in said oil supply in front of said opening.

In testimony whereof we have signed our names.

OSCAR ANTON WIBERG.
GEORG ARNÖ.